Sept. 18, 1923.
J. O. BELT
1,468,099
INNER TUBE PROTECTOR
Filed Dec. 28, 1921
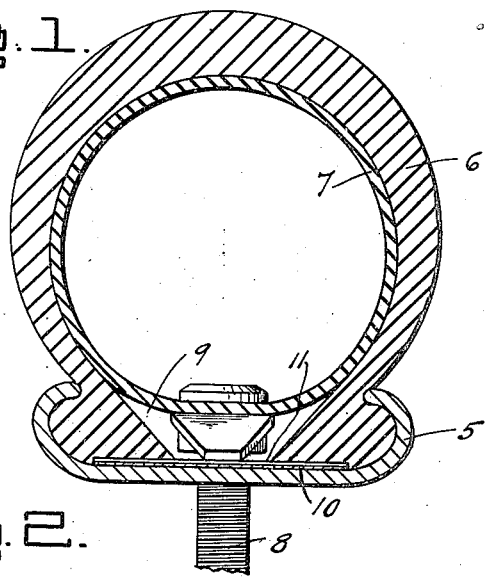
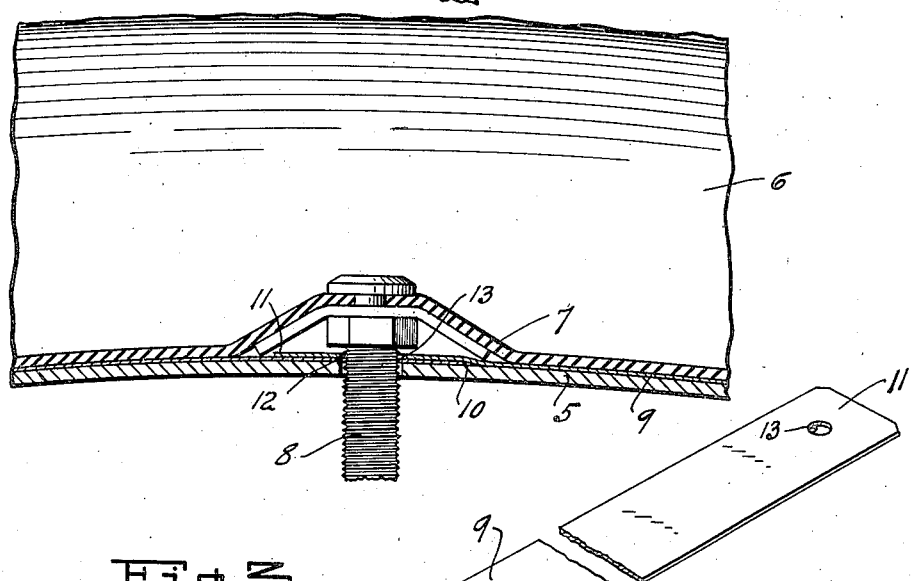
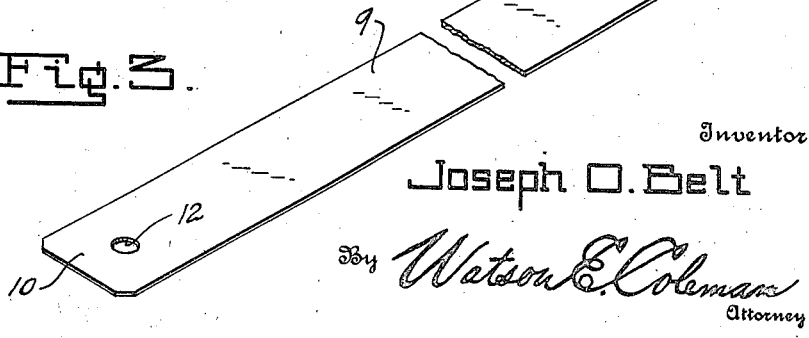
Inventor
Joseph O. Belt
By Watson E. Coleman
Attorney Patented Sept. 18, 1923.

1,468,099

UNITED STATES PATENT OFFICE.

JOSEPH O. BELT, OF JOPLIN, MISSOURI.

INNER-TUBE PROTECTOR.

Application filed December 28, 1921. Serial No. 525,490.

*To all whom it may concern:*

Be it known that I, JOSEPH O. BELT, a citizen of the United States, residing at Joplin, in the county of Jasper and State of Missouri, have invented certain new and useful Improvements in Inner-Tube Protectors, of which the following is a specification, reference being had to the accompanying drawings.

This invention relates to protectors and more particularly to protectors for the inner tubes of pneumatic tires.

It has been found that old tire rims, in view of rust, become rough and in the course of travel the inner tube of the tire comes in contact with the roughened surface, causing wear and eventually damage to the inner tube.

It is, therefore, an object of the invention to provide a protector capable of preventing decay of the inner tube, due to this condition regardless of the corroding of the tire rim.

Another object of the invention is to provide a protector of this character constructed of non-corrosive material capable of being applied to clincher rims to prevent contact of the inner face or exposed portion of the inner tube with the tire rim.

It is a further object of the invention to provide a protector of this character in the form of a length of flexible material adapted to be disposed between the tire rim and tire casing, and held in position through the medium of the valve stem of the inner tube.

With these and other objects in view, the invention consists in the improved construction and arrangement of parts to be hereinafter more particularly described, fully claimed and illustrated in the accompanying drawings, in which:—

Figure 1 is a transverse sectional view of a pneumatic tire, showing the invention applied;

Figure 2 is a longitudinal sectional view, showing the invention applied; and

Figure 3 is a perspective view of the protector.

Referring to the drawings, 5 designates a tire rim of conventional form and 6 the tire casing, an inner tube 7 being disposed within the casing, the inner tube being provided with a valve stem 8. This structure is well known, and forms no part of the invention. It is the purpose, however, of the invention to improve this structure to prolong the life of the inner tube by the elimination of wear to a large extent.

To accomplish the above, there is provided a novel form of protector 9 consisting of a length of non-corrosive material such as fiber, zinc, brass, copper, aluminum, etc., the length being relatively thin so that it will flex and thereby prevent interference with the operation of the tire. The strip 9 may be made in various lengths to correspond to the various sizes of tire rims, the length of the strip or protector in any case being greater than the inner diameter of the tire rim, the width of the protector being also regulated according to the size of the rim, the width substantially corresponding to the distance between the clincher portions of the tire rim 5 so as to extend over the entire inner face or wall of the tire rim 5 and prevent contact of the inner tube with the tire rim 5. The end portions 10 and 11 of the protector are provided with openings 12 and 13, said openings being disposed centrally of the end portions 10 and 11 and are large enough to receive the the valve stem 8 of the inner tube.

In the application of the protector, the same is engaged with the inner face or wall of the rim and the end portions 10 and 11 disposed in overlapping relation so that when the openings 12 and 13 register the diameter of the protector will correspond to the inner diameter of the tire. The registering openings are intended to receive the valve stem 8 of the tube to prevent disengagement of the protector from the inner tube without the use of additional fastening means. When the tire casing 6 and inner tube 7 are applied to the tire rim 5 the previously exposed portion of the inner tube is prevented from contact at any point with the tire rim 5 so that regardless of the rusting of the tire rim, there is no danger of wear on the inner tube, as the protector is made of non-corrosive material and is not movable independently of the inner tube, in view of the connection of the protector with the valve stem of the inner tube.

From the foregoing it will be readily seen that this invention provides a novel form of protector which does not interfere with the function of the inner tube, can be readily applied by anyone without the use of special fastening means by causing the valve stem 8 to perform a function in addition to its usual function as inlet and outlet of the inner tube, and all of these features are contained in a protector that can be stamped of sheet material.

What is claimed is:—

The combination with an inner tube, a tire casing and a rim, the inner tube being provided with a valve stem, of a protector consisting of a strip of slightly flexible, non-corrosive metal substantially corresponding in width to the width of the outer face of the tire rim and having a uniform thickness throughout its entire extent, said protector being disposed between the inner faces of the beads of the tire casing and the outer face of the tire rim, the end portions of said strip having registering openings arranged to register when the end portions are disposed in overlapped relation upon the rim and being adapted to receive the valve stem, the valve stem preventing longitudinal movement of the protector relative to the tire casing and rim.

In testimony whereof I hereunto affix my signature.

JOSEPH O. BELT.